United States Patent
Hovinga et al.

(10) Patent No.: US 12,019,311 B2
(45) Date of Patent: Jun. 25, 2024

(54) OPHTHALMIC LENS INCLUDING A PERIPHERAL ZONE HAVING AN ADD-POWER OFFSET AND A SPATIALLY-MODULATED OPTICAL PARAMETER

(71) Applicant: Bausch + Lomb Ireland Limited, Dublin (IE)

(72) Inventors: Kristen Hovinga, Honeoye Falls, NY (US); Mohammad Musleh, Rochester, NY (US); Mengchen Xu, West Henrietta, NY (US)

(73) Assignee: Bausch & Lomb Ireland Limited, Dublin (IE)

( * ) Notice: Subject to any disclaimer, the term of this patent is extended or adjusted under 35 U.S.C. 154(b) by 481 days.

(21) Appl. No.: 17/089,233

(22) Filed: Nov. 4, 2020

(65) Prior Publication Data
US 2022/0137432 A1    May 5, 2022

(51) Int. Cl.
G02C 7/04    (2006.01)

(52) U.S. Cl.
CPC ............. *G02C 7/044* (2013.01); *G02C 7/049* (2013.01)

(58) Field of Classification Search
CPC .................................. G02C 7/049; G02C 7/044
USPC .................................................... 351/159.02
See application file for complete search history.

(56) References Cited

U.S. PATENT DOCUMENTS

| | | | |
|---|---|---|---|
| 7,025,460 B2 | 4/2006 | Smitth et al. | |
| 7,503,655 B2 | 3/2009 | Smith, III et al. | |
| 7,637,612 B2 | 12/2009 | Menezes | |
| 7,665,842 B2 | 2/2010 | Ho et al. | |
| 8,240,847 B2 | 8/2012 | Holden et al. | |
| 8,770,745 B2 | 7/2014 | Lindacher et al. | |
| 8,876,287 B2 | 11/2014 | Back et al. | |
| 8,950,860 B2 | 2/2015 | Tse et al. | |
| 8,998,408 B2 | 4/2015 | Wei | |
| 9,720,253 B2 | 8/2017 | Neitz et al. | |
| 9,827,250 B2 * | 11/2017 | Chehab | A61K 31/46 |
| 10,191,300 B2 | 1/2019 | Holden et al. | |
| 11,061,253 B2 | 7/2021 | Back et al. | |

(Continued)

FOREIGN PATENT DOCUMENTS

| | | | | |
|---|---|---|---|---|
| EP | 3 336 600 A1 | 6/2018 | | |
| EP | 3336600 A1 * | 6/2018 | ........... | A61F 2/1451 |

(Continued)

OTHER PUBLICATIONS

Zheleznyak et al., Optical and neural anisotropy in peripheral vision, Journal of Vision (2016) 16(5):1, 1-11.

(Continued)

*Primary Examiner* — James R Greece
(74) *Attorney, Agent, or Firm* — Simpson & Simpson, PLLC

(57) ABSTRACT

An ophthalmic lens, comprising a central zone having at least a first power, and a peripheral zone having an add-power offset relative to the at least first power and a spatially-modulated optical parameter. In some embodiments, the central zone has a diameter in the range 2.0 to 5.0 mm. In some embodiments, the central zone is not more than 1 mm smaller than a wearer's pupil. The spatially-modulated optical parameter may include optical power, light scattering or light transmission.

19 Claims, 3 Drawing Sheets

(56) References Cited

U.S. PATENT DOCUMENTS

| | | |
|---|---|---|
| 2008/0218687 A1 | 9/2008 | Phillips |
| 2010/0036489 A1* | 2/2010 | Lindacher ............. G02C 7/028 623/6.27 |
| 2018/0243082 A1 | 8/2018 | Zheleznyak et al. |
| 2018/0275427 A1 | 9/2018 | Lau et al. |
| 2019/0293963 A1 | 9/2019 | Holden et al. |
| 2022/0404639 A1 | 12/2022 | Lam et al. |

FOREIGN PATENT DOCUMENTS

| | | | | |
|---|---|---|---|---|
| WO | WO-2013166308 A1 * | 11/2013 | ........... | A61F 2/1618 |
| WO | 2019/102415 A1 | 5/2019 | | |

OTHER PUBLICATIONS

Pending claims from commonly-owned U.S. Appl. No. 18/355,907, filed Jul. 20, 2023.

Qiuzhi et al., Through-focus optical characteristics of monofocal and bifocal soft contact lenses across the peripheral visual field, The Authors Ophthalmic & Physiological Optics, The College of Optometrists Ophthalmic & Physiological Optics 38 (2018) 326-336.

Yifei et al., A potential optical mechanism of bifocal contact lenses in myopia control; Jul. 2019.

\* cited by examiner

OPHTHALMIC LENS INCLUDING A PERIPHERAL ZONE HAVING AN ADD-POWER OFFSET AND A SPATIALLY-MODULATED OPTICAL PARAMETER

FIELD

Methods and apparatus for reducing or eliminating myopia progression including an ophthalmic lens, and more particularly methods and apparatus for reducing or eliminating myopia progression including an ophthalmic lens with a peripheral zone having an add-power offset and a spatially-modulated optical parameter.

BACKGROUND

Myopia is a condition of the eye resulting in objects at a far distance (e.g., greater than six meters) being focused in front of the retina, thereby causing blurred vision. Myopia is normally corrected with the use of ophthalmic lenses of sufficient negative power to bring distant objects into focus on the central retina, while allowing near objects to be focused on the central region of the retina by accommodation of the lens of the eye.

Most commonly, myopia occurs when eye growth is excessive, resulting in an imbalance between the axial length of the eye relative to focal power of the eye. Myopia is commonly a progressive disorder associated with gradual elongation of the eye. A number of undesirable pathologies (e.g., retinal detachment and glaucoma) may occur as a result of eye elongation arising from progressive myopia.

It is now generally accepted that increases in axial length of an eye of a growing animal is controlled by a feedback mechanism that occurs within the eye, which allows light entering the eye to be focused onto the central region of the retina. In an emmetropic eye, this mechanism works well and axial length and focal power of the eye remain in balance allowing for light to be focused onto the central region of the retina as the eye grows; however, in a myopic eye, the elongation is excessive and, in a hyperopic eye, elongation is insufficient thereby resulting in poorly focused light being projected onto the central region of the retina.

Multiple theories exist regarding the feedback mechanism of the eye. According to one theory, the location of the peripheral image controls eye growth. More particularly, under this theory, a stimulus for increased eye length is created when the peripheral focal plane lies behind (i.e., posterior to) the retina. According to this theory, a multizonal ophthalmic lens to control myopia progression is provided with a peripheral zone having a refractive add-power offset relative to the central zone of the lens thereby shifting the focal plane in front of (i.e., anterior to) the peripheral retina and eliminating the stimulus for growth.

In lenses made according to this theory, the lens is constructed such that visual rays (i.e., rays forming perceivable visual images) essentially pass only through a central zone of such a multizonal lens, and the peripheral zone is located radially outward of the central zone so as to direct light outside of the central, visual portion of the retina. Accordingly, if the central zone is configured for single vision, given normal accommodation of an eye, only an image formed by the central zone will be focused on the retina and light passing through the peripheral zone is focused in front of the retina. At a given time, the image formed by the central zone can be of a distant object or a near object depending on the accommodative state of the eye.

Multizonal lenses having a peripheral zone with an add-power offset relative to the central zone are understood to be distinct from multizonal, bifocal contact lenses where a central zone and an outer zone of the lens overlie the pupil such that visual rays intercept both the central zone and the outer zone. In bifocal lenses, because the outer zone has a different power than the central zone, visual rays from the zones form two images on the central retina at all times (one focused and the other out of focus). At a given time, the in-focus image can be of a distant object or a near object depending on the accommodative state of the eye.

While lenses having a peripheral zone with an add-power offset relative to the central zone of the lens have been shown to be effective in achieving suppression of myopia progression for some wearers, other wearers have not achieved the desired suppression and/or have had their vision compromised by disturbances (e.g., glares and halos) resulting from stray light passing through the peripheral zone of the lens.

SUMMARY

It is believed that the lack of efficacy for some wearers of conventional lenses designed to suppress the progression of myopia using a peripheral zone add-power offset results from (1) a prescribed lens allowing peripheral hyperopic defocus to occur at some accommodative states of a given wearer's eye and/or (2) some wearer's eyes being less responsive to a peripheral defocus.

Aspects of the present invention are directed to a multizonal ophthalmic lens comprising a peripheral zone having an add-power offset relative to a central zone, the peripheral zone also having a spatially-modulated optical parameter. In the event that a given wearer's eye is exposed to peripheral hyperopic defocus when the eye is in a given accommodative state, the spatially modulated optical parameter provides suppression of progression of myopia. Additionally, for those wearer's that are less responsive to peripheral defocus, the modulated optical parameter provides an additional mode of operation to suppress progression of myopia.

A multizonal lens according the aspects of the present invention (i.e., a lens comprising a peripheral zone having an add-power offset relative to a central zone, with a spatially-modulated optical parameter) provides a given efficacy for reducing or eliminating progression of myopia that is less likely to give rise to a perceivable visual disturbances (e.g., glare and halos) than a multizonal lens providing the same efficacy but comprising a peripheral region having a uniform (i.e., non-modulated) power offset. For example, as a result of effects caused by the modulation of the optical parameter, the add-power offset between the central zone and the peripheral zone may be reduced leading to decreased glare and halos.

As progressive myopia most commonly afflicts children and young adults, the diameter of the central optical zone of lenses according to aspects of the present invention may be greater than about 3 mm to reasonably ensure that the central zone is larger than a wearer's pupil under photopic conditions. However, as is understood in the art, due to the existence of what is known as the Stiles-Crawford effect, light rays that pass close to the edge of visual image forming portion of the eye (also called "peripheral rays"), have less visual significance than those rays that travel nearer the center of the pupil. Thus, the central optical zone need not be greater than the pupil diameter of the eye to be effective. Accounting for the Stiles-Crawford effect, it is typically desirable that the radius of a central optical zone of a lens be no more than 1 mm smaller than the radius of the pupil of a wearer's eye (e.g., 2 mm in diameter).

As is understood in the art, lenses are typically not custom-made for a wearer. Accordingly, lenses may be designed such that a central zone diameter of a lens is not more than 1 mm less that a normal (i.e., average) pupil diameter of an eye of a selected population.

An aspect of the present invention is directed to an ophthalmic lens, comprising a central zone having at least a first power, and a peripheral zone disposed radially outward of the central zone. The peripheral zone having an add-power offset relative to the at least first power and a spatially-modulated optical parameter. In some embodiments, the central zone has a diameter in the range 2.0 to 5.0 mm. In some embodiments, the central zone is not more than 1 mm smaller than a wearer's pupil. In some embodiments, the central zone has a diameter of at least 3 mm. In some embodiments, the central zone has a diameter of at least 2.0 mm.

In some embodiments, the add power offset is in the range 0.5 diopters to 5 diopters. The lens may further comprise a transition zone between the central zone and the peripheral zone such that the power profile from the optical axis to the outer diameter of the peripheral zone varies continuously. In some embodiments, there is a step in power between the central zone and the peripheral zone.

In some embodiments, the spatially-modulated optical parameter is optical power. In some embodiments, the spatially-modulated optical power has a plurality of maxima and minima along a radial dimension, and the maxima and/or the minima increase as a function of radial position. In some embodiments, the spatially-modulated optical power has a plurality of maxima and minima along a radial dimension, and the maxima have a same dioptric value as one another, and minima have a same dioptric value as one another.

In some embodiments, the add power offset is in the range 0.5 diopters to 5 diopters. In some embodiments, the peripheral zone has a base power and power differences between the base power and each of the maxima is in the range 0.05 diopters to 2 diopters.

The spatially-modulated optical parameter may be light scattering. The spatially-modulated optical parameter may be light transmission.

The lens may be a contact lens. The central zone may have only a single power.

In some embodiments, the peripheral zone is characterized by a smoothly varying power profile. In other embodiments, the peripheral zone is characterized by a power profile having one or more discontinuities between a power minima and a power maxima.

In some embodiments, the base power is uniform across the peripheral zone. In other embodiments, the base power increases as a function of radial position across the peripheral zone. The lens may be rotationally symmetric.

These and other aspects of the present invention will become apparent upon a review of the following detailed description and the claims appended thereto.

It is understood that a multizonal contact lens is a contact lens where different portions or areas of the lens have different optical parameters or functions, for example, different refractive powers. Multifocal contact lenses are a sub-class of multi-zonal contact lenses characterized by the fact that the central zone of the lens, corresponding roughly to normal pupil diameter, has at least two zones of different refractive power corresponding to objects at different distances (e.g. corresponding to near vision and far vision). Multifocal lenses provide a wearer with two images (simultaneously) and, possibly, with a transition zone between the zones.

The term "optical parameter" is defined herein as a characteristic of a lens that effects the quality of the image formed by the lens. For example, optical parameters include optical power, transparency, aberration (e.g., including higher order aberrations) or scattering. For example, modulations can be realized using changes in surface curvature, index of refraction, surface texture, and material properties.

The term "spatially-modulated" is defined herein to mean a variation over a given distance (i.e., radially and/or circumferentially), for example along a surface of a lens or within the body of a lens. A spatially modulated optical parameter has a plurality of maxima and minima over the given distance. The maxima (or minima) may be of equal value or different values. A spatially-modulated optical parameter decreases the ability of a lens to form a quality image due to localized variation of a characteristic of the lens. For example, spatial modulation of an optical parameter may comprise variation in optical power of the lens, variation in aberration content, variation in the light transmission (e.g., introducing localized translucent inclusions, surface texturing, film or coating) or variations in light scattering (e.g., introducing localized scattering inclusions, surface texturing, film or coating). Scattering may occur due to light absorption and re-emission or due to specular or diffuse reflection of light. For example, spatial modulation of optical power can be illustrated using a power profile.

The term "greater" and the term "add-power offset" as used herein mean that an identified value (e.g., an optical power) is more positive than or less negative than a specified reference value. For example, a peripheral power may be greater than a central zone power. Alternatively, it may be stated that the peripheral power has an add-power offset relative to the central zone power.

DETAILED DESCRIPTION

Aspects of the invention will be further illustrated with reference to specific examples. It is understood that these examples are given by way of illustration and are not meant to limit the scope of the claims to specific examples.

Figure 1A:
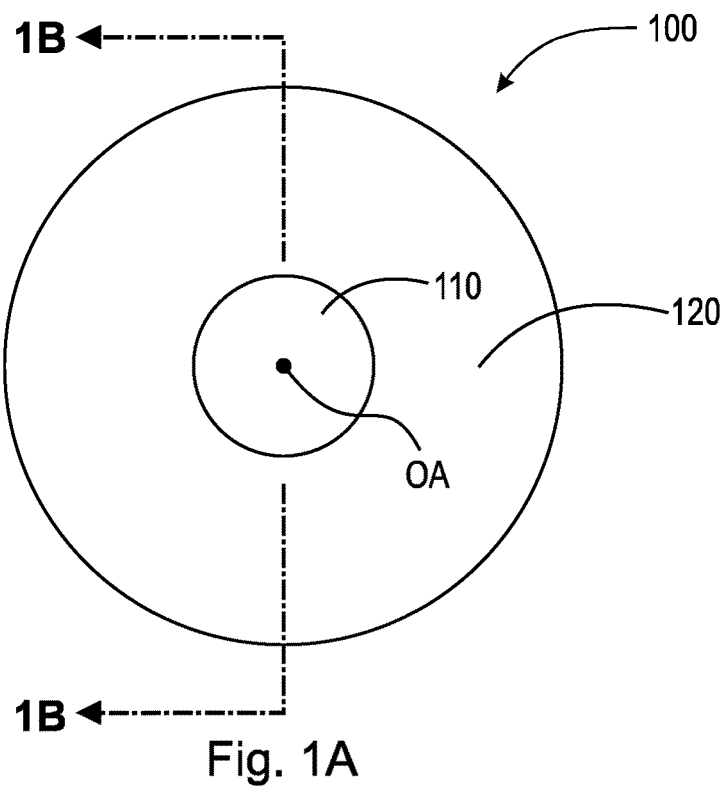
FIG. 1A is a schematic plan view of an example of an ophthalmic lens according to aspects of the present invention.
Figure 1B:
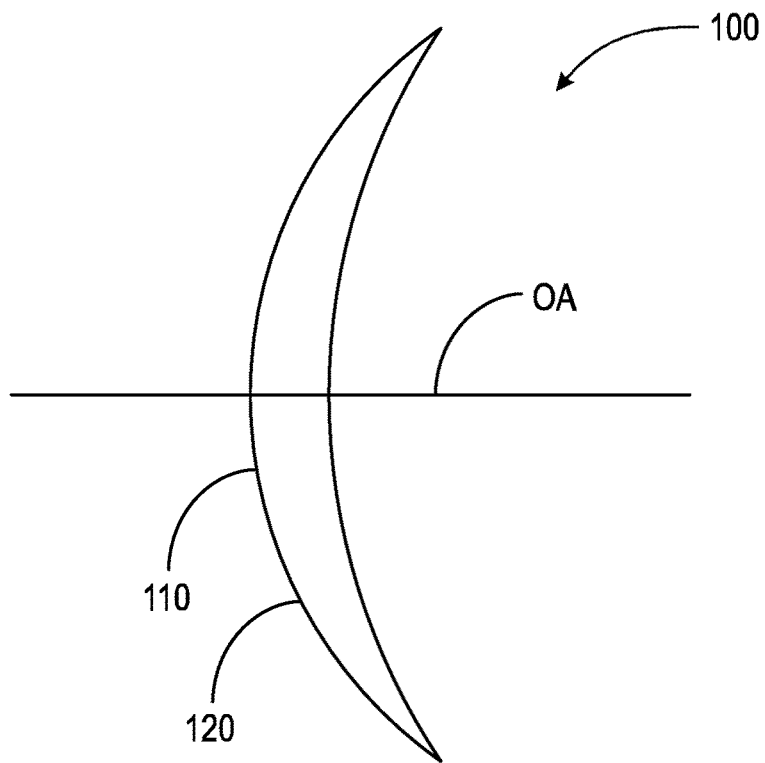
FIG. 1B is a schematic cross-sectional view of the lens of FIG. 1A taken along line 1B-1B of FIG. 1A.

FIGS. 1A and 1B are schematic illustrations of an example of an ophthalmic lens according to aspects of the present invention.

Ophthalmic lens 100 comprises an optical axis OA, a central zone 110 and a peripheral zone 120. Although the illustrated lens is circularly symmetric and has optical axis OA aligned with the mechanical axis of the lens, deviation from such an arrangement is possible. Ophthalmic lens 100 is illustrated as a contact lens; however, lenses according to aspects of the invention may be embodied as other ophthalmic lenses that remain stationary relative to the eye. For example, a lens may be a corneal inlay, a corneal only, an intraocular lens or other such ophthalmic lens.

Central zone 110 has at least a first power. The central zone may be of any suitable power profile and includes at least one region providing distance vision correction. For example, the central zone may have only a single power or a progressive power design or a multifocal design.

As stated above, because progressive myopia most commonly afflicts children and young adults, the diameter of central optical zone 110 of lenses according to aspects of the present invention will typically be greater than about 3 mm to reasonably ensure that the central zone is larger than a wearer's pupil under photopic conditions. However, light rays that pass close to the edge of visual image forming portion of the eye as they progress toward the retina have less visual significance than those rays that travel nearer the center of the pupil. Thus, the central optical zone need not be equal to or greater than the pupil diameter of the eye to be effective. Accounting for the Stiles-Crawford effect, it is typically desirable that a central optical zone is not more than 1 mm smaller than the diameter of the pupil of a wearer's eye. For example, the central zone may have a diameter of at least 2.0 mm or a diameter of at least 3.0 mm or a diameter of at least 4.0 mm. The diameter of the central zone will typically be in the range 2.5 to 5.0 mm and chosen (in part) to avoid visual disturbances in a given population during selected lighting conditions.

Figure 2A:
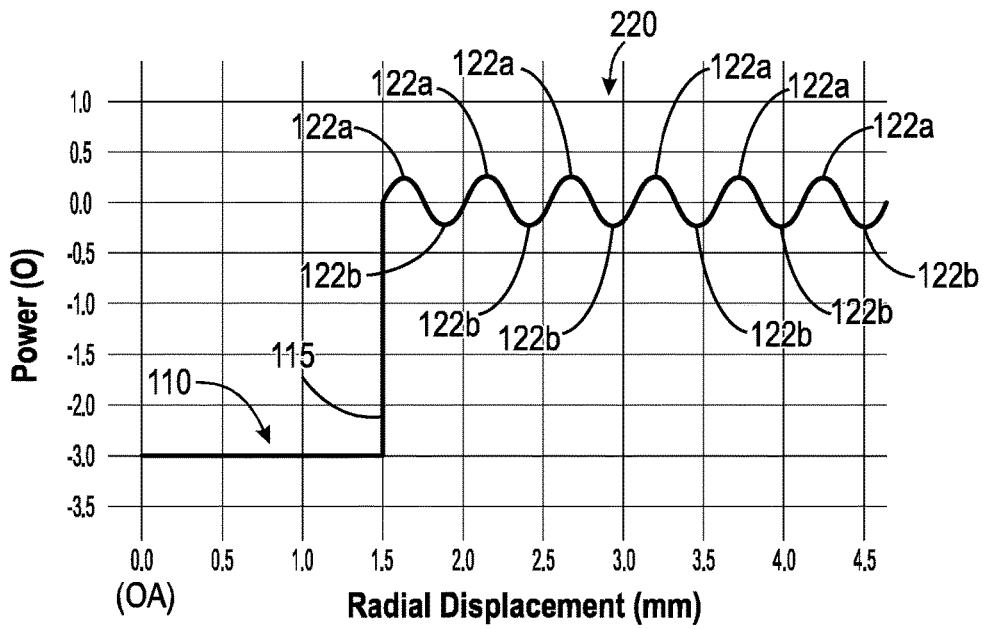
FIG. 2A illustrates one example of a power profile of an ophthalmic lens in which spatial-modulation of an optical parameter of a peripheral zone is achieved using a variation in optical power.

Peripheral zone 120 is disposed radially outward from the central zone. The peripheral zone has an add-power offset 115 relative to the at least first power. As shown in the embodiment of FIG. 2A, the offset may be achieved by a step in power at the edge of the central zone; however, in some embodiments, a transition zone may be present between the central zone and the peripheral zone such that the power profile from the optical axis to the outer diameter of the peripheral zone varies continuously such that the offset may be achieved by a more gradual increase in power. The transition zone may be a non-optical surface smoothening feature. Regardless of whether the offset is achieved by a step or a more gradual increase, a discontinuity in the power profile is typically present at the edge of the central zone. The add power offset is usually relative to a central zone power providing distance vision correction. The peripheral zone power is typically greater than any power present in the central zone.

In addition to the add-power offset, the peripheral zone is adapted to have a spatially-modulated optical parameter. As indicated above, a spatially-modulated optical parameter decreases the ability of a lens to form a quality image due to localized variation of a characteristic of the lens. For example, embodiments of lenses according to aspects of the present invention may include spatial modulation of one or more of the following optical parameters: optical power, optical aberrations, light transmission (e.g., using translucent inclusions) or light scattering (e.g., using scattering inclusions).

Under nominal accommodative conditions, the peripheral zone provides a myopic defocus due to the add power offset which, as indicated above, acts to suppress myopia progression; however, should the eye of a wearer deviate from nominal such that peripheral hyperopic focus occur, spatial modulation of the optical parameter in the peripheral zone will continue to provide suppression of myopia progression.

Additionally, for those wearers that are less responsive to the suppression of myopia progression resulting from peripheral defocus, the spatial modulation of the optical parameter provides another mode of action for suppression of progression.

The central zone is designed to achieve optimal vision correction using conventional techniques. Typically, achieving optimal vision corrections, means that the central zone is corrected for distance vision and is free of spatial modulation of the optical parameter.

FIG. 2A illustrates one example of a power profile of a lens in which spatial-modulation of an optical parameter of a peripheral zone is achieved using a variation in optical power. The radial power profile of peripheral zone 220 includes a plurality of maxima 122*a* and minima 122*b*. That is to say, the power is modulated in the radial direction to achieve power of varying magnitude along the peripheral zone. Radial power may be varied using localized variations in surface curvature or localized variations in index of refraction.

A radial power profile of the peripheral zone can have any of a variety of shapes comprising maxima and minima. For example, the power profile may smoothly vary as shown in FIG. 2A or the shape may include non-continuous transitions between regions of higher power and lower power. The shape can comprise sinusoidally-shaped portions, linear portions or other configurations.

The base power in the peripheral zone may be uniform in the radial direction with the spatial modulation causing offsets from the base power. Alternatively, the base power may vary (increase or decrease) in the radial direction with the spatial modulation causing offsets from the base power at a given location.

Figure 2B:
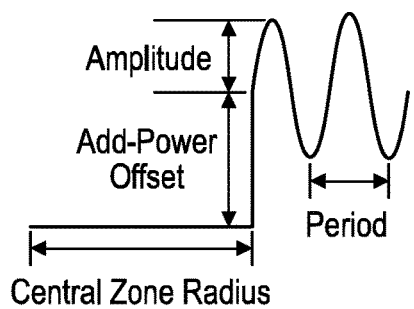
FIG. 2B illustrates examples of characteristics of a power profile that may be varied to balance myopia progression suppression efficacy and likelihood of a wearer experiencing visual disturbances.

As shown in FIG. 2B, various characteristics of a power profile of a lens having a peripheral zone with a spatially-modulated power profile are selected to achieve myopia progression suppression. Typically, the power profile is selected to balance myopia progression suppression efficacy and visual disturbances. Suppression of myopia progression and the presence of visual disturbances can be modeled using optical design software and/or by clinical testing.

An add power offset between the first power and the base power of the peripheral zone will typically be in the range of 0.5 diopters to 5 diopters. For example, the offset may be 3.0 diopters.

The power difference between the base power of the peripheral zone and the maxima will typically be in the range 0.05 diopters to 2 diopters, and in some instances in the range 0.25 diopters to 1.5 diopters. In some instances, in a given radial profile, all maxima have a same dioptric power and all minima have a same dioptric power; however, in some embodiments (see FIG. 2C), the maxima and/or the minima in a given radial profile may have different dioptric powers.

Figure 2C:
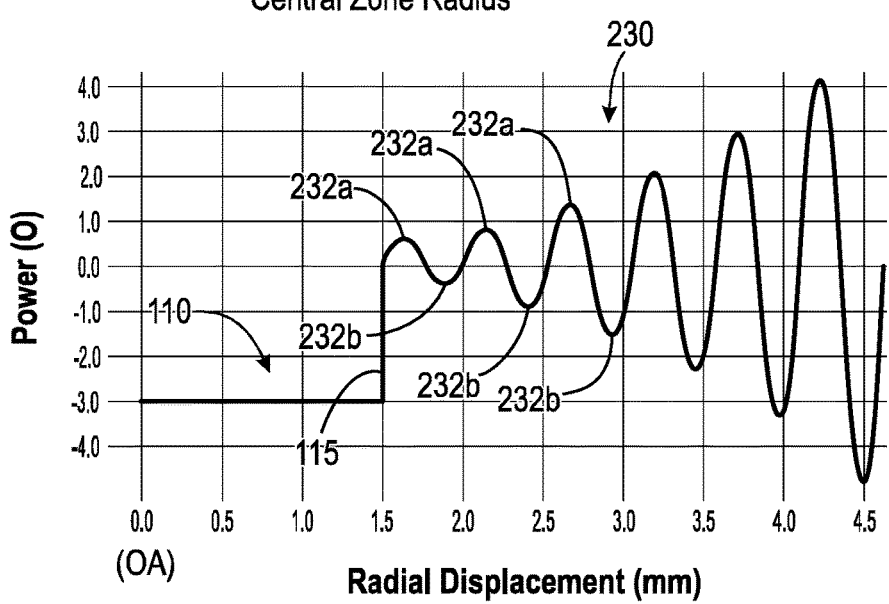
FIG. 2C illustrates another example of a power profile of an ophthalmic lens in which spatial-modulation of an optical parameter of a peripheral zone is achieved using variation in optical power in the radial direction.

FIG. 2C illustrates another example of a power profile of an ophthalmic lens in which spatial-modulation of an optical parameter of a peripheral zone 230 is achieved using optical power in the radial direction, however, the maximum dioptric values and the minimum dioptric values vary as a function of radial location. In particular, in the illustrated embodiment, the dioptric values of the maxim and minima increase as a function of radial location. In such a lens, the reduced variation at radially inward locations results in less visual disturbance (i.e., spurious directing of light into the visual portion of the retina), while the increased variation at radially outward locations increase efficacy (i.e., suppression of myopia progression).

The embodiments of FIGS. 2A-2C may be rotationally symmetric or may also have spatial modulation of the power in the circumferential direction. According to aspects of the present invention, a lens may have spatial modulation in the radial and/or circumferential directions.

Figure 3:
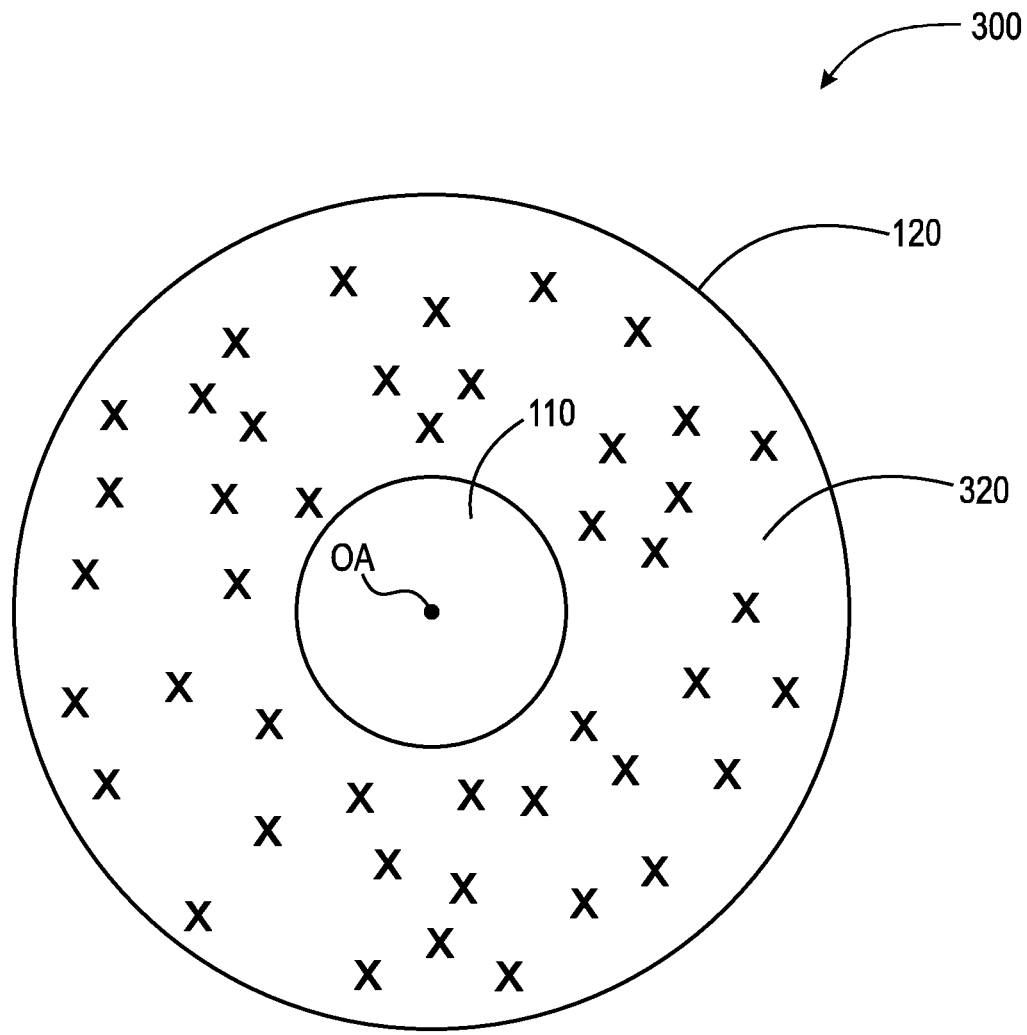
FIG. 3 illustrates one example of a lens in which spatial-modulation of an optical parameter of a peripheral zone is achieved using variations of an optical parameter other than optical power.

FIG. 3 is a schematic illustration of one example of a lens 300 in which spatial-modulation of an optical parameter of a peripheral zone is achieved using variations of an optical parameter other than optical power. For example, variation may be achieved using variation in optical aberrations, variation in the light transmission (e.g., using a translucent inclusion) or light scattering (e.g., using scattering inclusions). Other than the type of optical parameter that is varied, lens 300 is the same as lens 100 described above.

Like spatial-modulated power as described above, spatial modulation of other optical parameter as described with reference to FIG. 3 operate to decrease the ability of a lens to form a quality image, and thereby suppress myopia progression. However, an advantage of using spatially modulated power is that, although the power modulation reduces image quality at any given focal plane, the resultant lens provides depth of field which can provide visual advantages.

In FIG. 3, localized variations are illustrated with x's. It will be appreciated that although the localized variations are shown in FIG. 3 as non-rotationally symmetric, in other embodiments such spatial modulation of optical parameters may be rotationally symmetric.

Hydrogel contact lenses are typically packaged in a buffered saline solution. If desired, the packaging solutions may include a pharmaceutical agent that reduces the progression of myopia. Representative pharmaceutical agents include muscarinic agents, such as atropine, pilocarpine, pirenzepine and derivatives and salts thereof.

If desired, the contact lens may be used to deliver other therapeutic agents, for example, various drug formulations, medications or active agents for treatment, inhibition and/or prevention of various diseases and disorders. Examples include: glaucoma treatment agents, such as brimonidine and salts thereof; anti-allergy agents such as ketotifen, phenylephrine and salts thereof; and vitamins, anti-oxidants and nutraceuticals including Vitamins A, D and E, lutein, zeaxanthin, taurine, fatty acids, and the like.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. An ophthalmic lens, comprising: a central zone having at least a first power; and a peripheral zone disposed radially outward of the central zone, the peripheral zone having an add-power offset relative to the at least first power and a smoothly varying spatially-modulated optical power profile that extends in a radially outward direction from a location radially outward of central zone, the power profile having a plurality of maxima and a plurality of minima.

2. The lens of claim 1, wherein the central zone has a diameter of at least 3 mm.

3. The lens of claim 1, wherein the central zone is not more than 1 mm smaller than a wearer's pupil.

4. The lens of claim 1, wherein the central zone has a diameter of at least 2.0 mm.

5. The lens of claim 1, wherein the central zone has a diameter in the range 2.0 to 5.0 mm.

6. The lens of claim 5, wherein the add power offset is in the range 0.5 diopters to 5 diopters.

7. The lens of claim 1, further comprising a transition zone between the central zone and the peripheral zone such that a power profile from an optical axis of the lens to the outer diameter of the peripheral zone varies continuously.

8. The lens of claim 1, wherein there is a step in power between the central zone and the peripheral zone.

9. The lens of claim 1, wherein the maxima or the minima increase as a function of radial position.

10. The lens of claim 1, wherein the maxima have a same dioptric value as one another and minima have a same dioptric value as one another.

11. The lens of claim 1, wherein the add power offset is in the range 0.5 diopters to 5 diopters.

12. The lens of claim 11, wherein the peripheral zone has a base power, and power differences between the base power and each of the maxima are in the range 0.05 diopters to 2 diopters.

13. The lens of claim 1, wherein the lens is a contact lens.

14. The lens of claim 1, wherein the central zone has a single power.

15. The lens of claim 12, wherein the base power is uniform across the peripheral zone.

16. The lens of claim 12, wherein the base power increases as a function of radial position across the peripheral zone.

17. The lens of claim 1, wherein the lens is rotationally symmetric.

18. The lens of claim 1, wherein the lens is a hydrogel contact lens packaged in combination with a buffered saline solution containing a pharmaceutical agent that reduces the progression of myopia.

19. The lens of claim 1, wherein the add power offset comprises a step in power.

* * * * *